US011009971B2

(12) United States Patent
Chang et al.

(10) Patent No.: US 11,009,971 B2
(45) Date of Patent: May 18, 2021

(54) INPUT DEVICE WITH A SCROLL WHEEL

(71) Applicant: DARFON ELECTRONICS CORP., Taoyuan (TW)

(72) Inventors: Ching-Chin Chang, Taoyuan (TW); Wen-Yu Tsai, Taoyuan (TW); Feng-Wei Su, Taoyuan (TW); Chun-Chieh Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 16/541,194

(22) Filed: Aug. 15, 2019

(65) Prior Publication Data

US 2020/0097100 A1 Mar. 26, 2020

Related U.S. Application Data

(63) Continuation-in-part of application No. 16/365,639, filed on Mar. 26, 2019, now abandoned.

(60) Provisional application No. 62/741,545, filed on Oct. 5, 2018, provisional application No. 62/733,657, filed on Sep. 20, 2018.

(51) Int. Cl.
*G06F 3/0354* (2013.01)
*G06F 3/0362* (2013.01)

(52) U.S. Cl.
CPC ........ *G06F 3/03543* (2013.01); *G06F 3/0362* (2013.01)

(58) Field of Classification Search
CPC .............................. G06F 3/03543; G06F 3/0362
See application file for complete search history.

(56) References Cited

U.S. PATENT DOCUMENTS

| 7,508,372 | B2 | 3/2009 | Blandin |
| 8,044,935 | B2 * | 10/2011 | Hsu ..................... G06F 3/03543 |
| | | | 345/163 |
| 2006/0092126 | A1 * | 5/2006 | Blandin ............. G06F 3/03543 |
| | | | 345/156 |

(Continued)

FOREIGN PATENT DOCUMENTS

| CN | 201867758 U | 6/2011 |
| CN | 207690032 U | 8/2018 |

(Continued)

*Primary Examiner* — William Boddie
*Assistant Examiner* — Andrew B Schnirel
(74) *Attorney, Agent, or Firm* — Winston Hsu (57) ABSTRACT

An input device includes a wheel supporting structure, a scroll wheel, a hook part, a linking part, and a switching mechanism. The scroll wheel is rotatably supported by the wheel supporting structure, is exposed from the input device, and has a rotary shaft with a plurality of toothed slots thereon. The hook part is disposed biased on the wheel supporting structure to selectively engage with the toothed slots. The linking part is pivotally connected to the wheel supporting structure. The switching mechanism includes an abutting part and a switching part. The abutting part abuts against the linking part. The switching part is coupled to the abutting part. Therein, the switching mechanism is operable to move the abutting part through the switching part to rotate the linking part to abut against and move the hook part to disengage from the toothed slots.

18 Claims, 12 Drawing Sheets

(56) References Cited

U.S. PATENT DOCUMENTS

| | | | |
|---|---|---|---|
| 2007/0132731 A1* | 6/2007 | Lin | G06F 3/03543 345/163 |
| 2007/0146324 A1 | 6/2007 | Blandin | |
| 2008/0165128 A1* | 7/2008 | Cheng | G06F 3/03543 345/163 |
| 2011/0227828 A1 | 9/2011 | Blandin | |
| 2013/0027306 A1 | 1/2013 | Peng | |
| 2013/0027308 A1 | 1/2013 | Peng | |
| 2013/0215031 A1 | 8/2013 | Peng | |
| 2018/0239446 A1* | 8/2018 | Lin | G06F 3/03543 |

FOREIGN PATENT DOCUMENTS

| | | |
|---|---|---|
| TW | M324818 | 1/2008 |
| TW | M350057 | 2/2009 |
| TW | 201107928 A1 | 3/2011 |
| TW | I448928 B | 8/2014 |
| TW | M498914 U | 4/2015 |
| TW | I622904 B | 5/2018 |

* cited by examiner

INPUT DEVICE WITH A SCROLL WHEEL

CROSS REFERENCE TO RELATED APPLICATIONS

This application is a continuation-in-part application of application Ser. No. 16/365,639, filed Mar. 26, 2019, which claims the benefit of U.S. Provisional Application No. 62/733,657 filed on Sep. 20, 2018 and Application No. 62/741,545 filed on Oct. 5, 2018 which are incorporated herein by reference.

BACKGROUND OF THE INVENTION

1. Field of the Invention

The present invention relates to an input device, and more particularly to an input device with a scroll wheel.

2. Description of the Prior Art

With the rapid development of technologies and the arrival of computer and multimedia age, the dependence of the people on various computer devices is also increased. Various peripheral input devices for the communication between users with computer systems, e.g. mice, keyboards, microphones and so on, play a vital role. Therein, mice are usually provided with a scroll wheel for users to perform operations of enlarging, shrinking, scrolling images on a screen and so on. Mice usually will provide tactile feedback to users when rotating the scroll wheel, so that the user can sense the rotation situation of the scroll wheel through the tactile feedback, which is convenient to enlarging and shrinking operations. However, the tactile feedback provided by the mice is usually constant. Mechanisms for providing the tactile feedback impede the rotation of the scroll wheel, which is inconvenient for the user to rotate the scroll wheel fast (e.g. in a case that the user wants to rapidly scrolling a Web page).

SUMMARY OF THE INVENTION

The present disclosure provides an input device that can selectively provide tactile feedback to users.

An input device of an embodiment according to the present invention includes a device casing, a wheel supporting structure, a scroll wheel, a hook part, a linking part, and a switching mechanism. The wheel supporting structure is disposed in the device casing. The scroll wheel is rotatably supported by the wheel supporting structure and protrudes out of the device casing. The scroll wheel has a rotary shaft. The rotary shaft has a peripheral surface and a plurality of toothed slots on the peripheral surface. The hook part is disposed biased on the wheel supporting structure to engage with one of the toothed slots. The linking part is pivotally connected to the wheel supporting structure. The switching mechanism is disposed in the device casing and includes an abutting part and a switching part. The abutting part abuts against the linking part. The switching part is coupled to the abutting part and the device casing respectively. Therein, the switching mechanism is operable to move the abutting part through the switching part to rotate the linking part to abut against and move the hook part to disengage from the toothed slots.

An input device of another embodiment according to the present invention includes a device casing, a bracket support, a wheel bracket, a scroll wheel, a hook part, a linking part, and a switching mechanism. The device casing has an accommodating space inside. The bracket support is fixed on the device casing. The wheel bracket is rotatably connected to the bracket support, so that the wheel bracket is operable to swing around an X axis. The scroll wheel is rotatably supported by the wheel bracket and protrudes out of the device casing. The scroll wheel has a rotary shaft. The rotary shaft extends along a rotation axis, so that the scroll wheel is operable to rotate around the rotation axis. The rotary shaft has a gear. The gear has a plurality of toothed slots on a peripheral surface of the gear. The rotation axis is perpendicular to the X axis. The hook part is disposed biased on the wheel bracket to selectively engage with one of the toothed slots. The linking part is pivotally connected to the wheel bracket. The switching mechanism is disposed on the wheel bracket and includes an abutting part and a switching part. The abutting part selectively abuts against the linking part. The switching part is coupled to the abutting part and the device casing respectively. Therein, the switching mechanism is operable to move the abutting part through the switching part to rotate the linking part to abut against and move the hook part to disengage from the toothed slots. Besides, when the wheel bracket swings around the X axis, the linking part and the hook part together with the wheel bracket swing around the X axis in the accommodating space.

Compared with the prior art, in the input device according to the present invention, the switching mechanism allows users to switch the rotation condition of the scroll wheel for different applications. Thereby, the input device can provide the tactile feedback to the users or not by request of the users.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
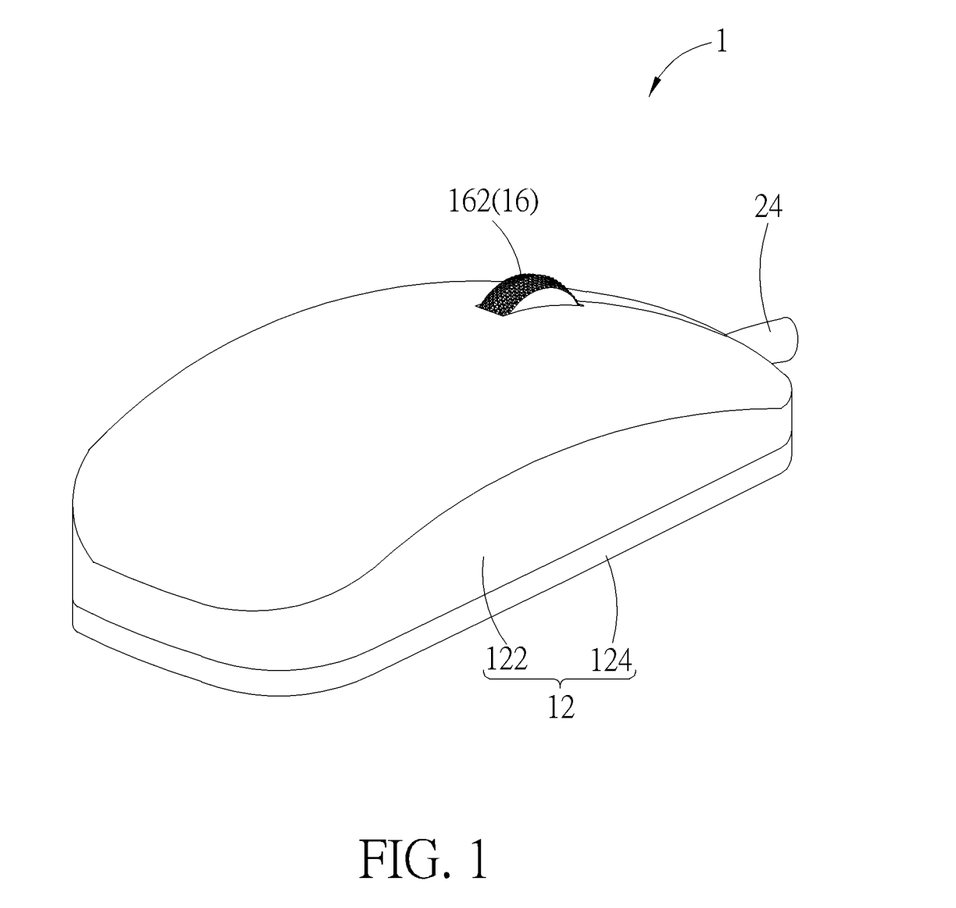
FIG. 1 is a schematic diagram illustrating an input device according to an embodiment.
Figure 2:
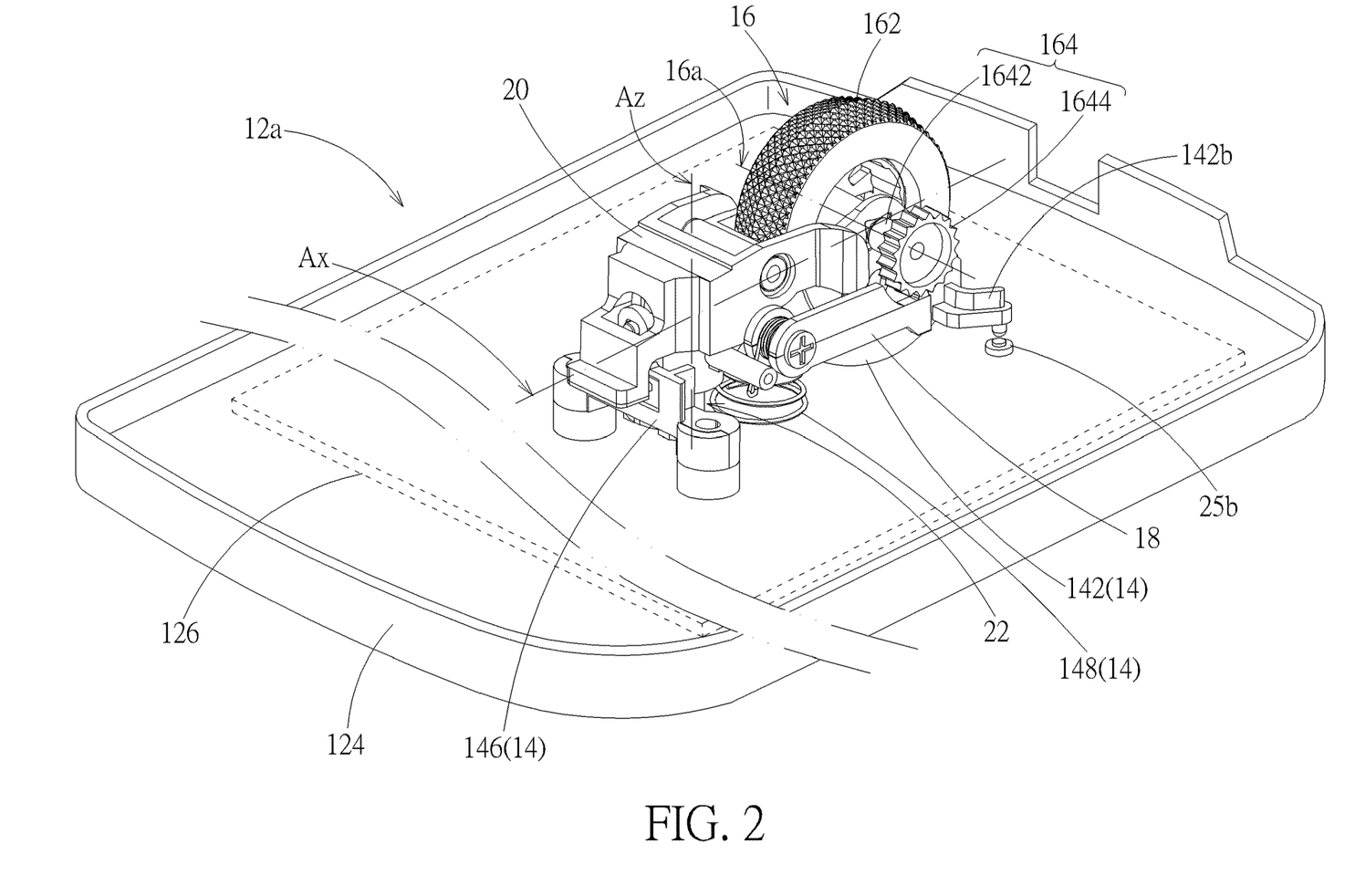
FIG. 2 is a schematic diagram illustrating the interior of the input device in FIG. 1.
Figure 3:
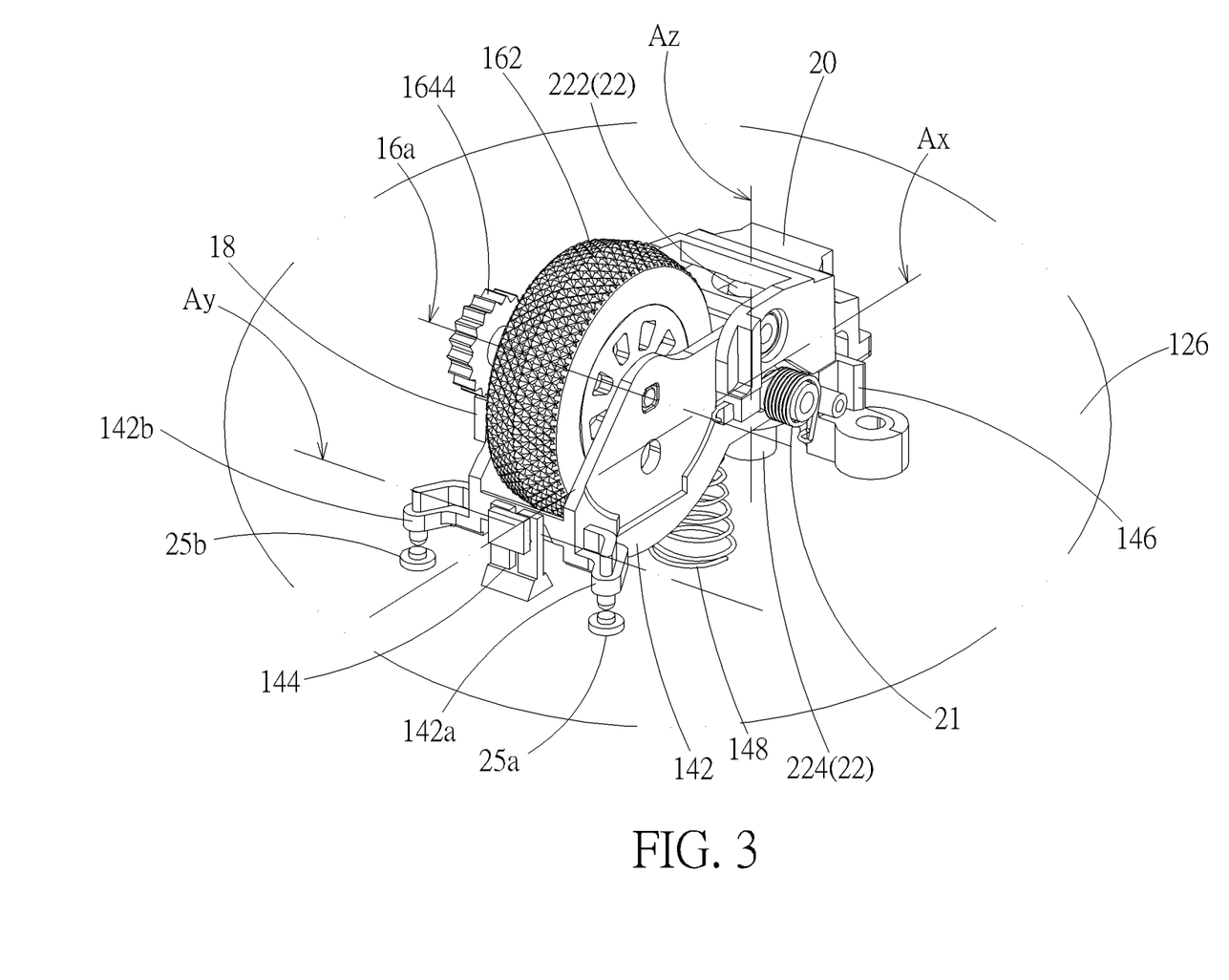
FIG. 3 is a schematic diagram illustrating the input device in FIG. 2 in another viewpoint.
Figure 4:
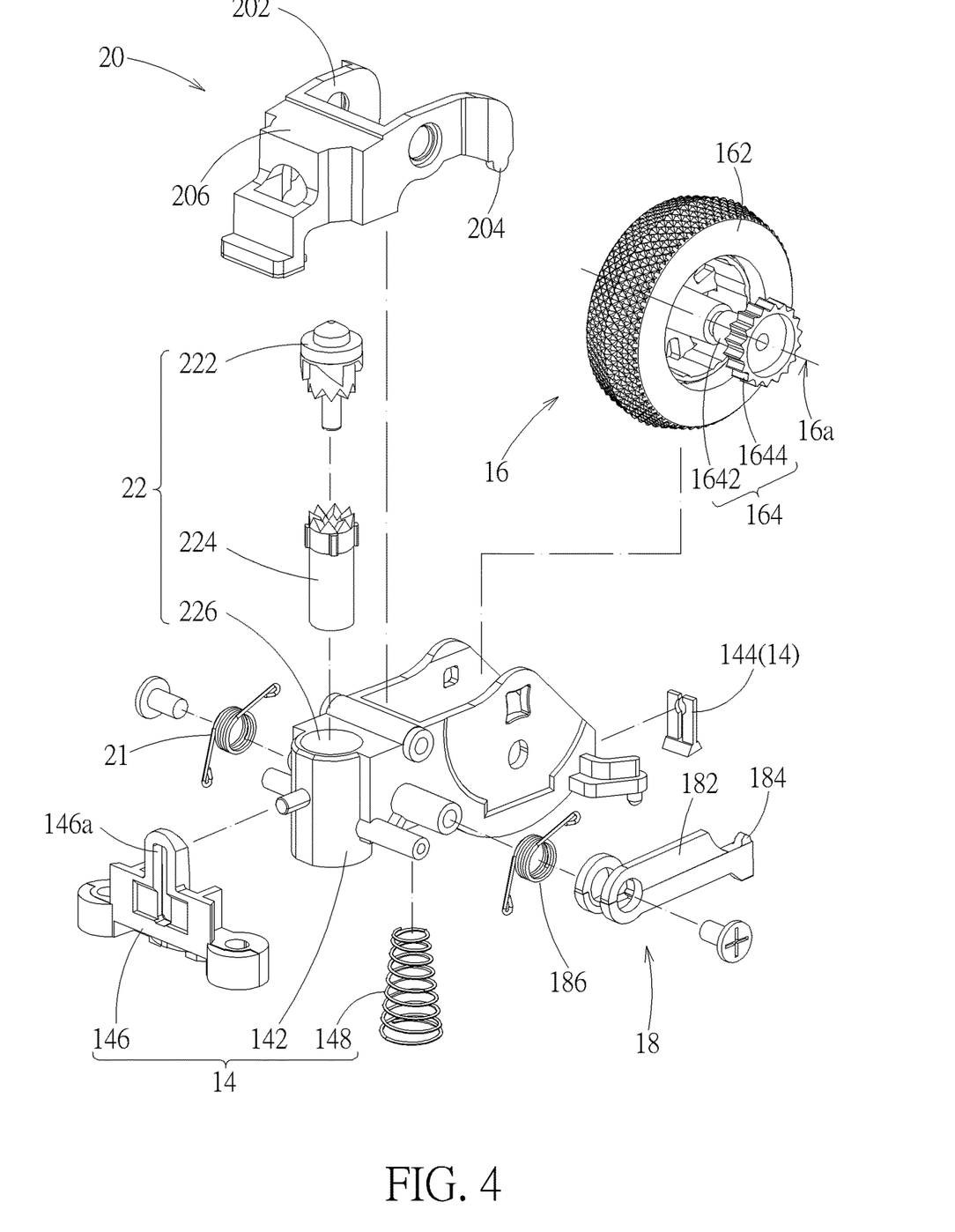
FIG. 4 is an exploded view of a portion of the input device in FIG. 2.

Please refer to FIG. 1 and FIG. 4. An input device 1 according to an embodiment includes a device casing 12, a wheel supporting structure 14, a scroll wheel 16, a hook part 18, a linking part 20, and a switching mechanism 22. The wheel supporting structure 14, the scroll wheel 16, the hook part 18, the linking part 20, and the switching mechanism 22 are disposed in the device casing 12. The scroll wheel 16 is rotatably supported by the wheel supporting structure 14 and has a wheel portion 162 and a rotary shaft 164 fixedly connected to the wheel portion 162. The rotary shaft 164 extends substantially along a rotation axis 16a (indicated by a chain line in FIG. 2 and FIG. 3), so that the scroll wheel 16 can rotate around the rotation axis 16a. The wheel portion 162 is rotatable relative to the device casing 12 through the rotary shaft 164. The wheel portion 162 protrudes out of the device casing 12, so that a user can rotate the scroll wheel 16 from the outside of the input device 1, e.g. rotating or pressing the scroll wheel 16. The rotary shaft 164 has a peripheral surface 1642 and a plurality of toothed slots 1644 on the peripheral surface 1642. In another aspect, the rotary shaft 164 has a gear. The plurality of toothed slots 1644 are disposed on the peripheral surface of the gear (i.e. the peripheral surface 1642). The hook part 18 is disposed biased on the wheel supporting structure 14 to engage with the toothed slots 1644; that is, the hook part 18 has a tendency to engage with the toothed slots 1644. The linking part 20 is pivotally connected to the wheel supporting structure 14 and abuts against the hook part 18. The switching mechanism 22 includes an abutting part 222 and a switching part 224. The switching part 224 is coupled to the abutting part 222 and the device casing 12 respectively. The abutting part 222 abuts against the linking part 20. Thereby, the switching mechanism 22 is operable to move the abutting part 222 through the switching part 224 to rotate the linking part 20 to move the hook part 18 to disengage from the toothed slots 1644.

Furthermore, in the embodiment, the device casing 12 includes an upper casing part 122 and a lower casing part 124 engaging with the upper casing part 122 to form an accommodating space for accommodating the wheel supporting structure 14, the scroll wheel 16, the hook part 18, the linking part 20, and the switching mechanism 22. The wheel supporting structure 14 is disposed on the lower casing part 124. The wheel portion 162 protrudes out of the upper casing part 122. Furthermore, in the embodiment, the device casing 12 also include a control module 126 (shown by a dashed rectangle in FIG. 2) disposed in the accommodating space 12a. In practice, the control module 126 can be achieved by but not limited to a circuit board module (that may include a circuit board and a control chip, required electronic units and other components disposed thereon) that can sense the rotation of the scroll wheel 16 (e.g. for a scroll input), sense the movement of the device casing 12 relative to the environment (e.g. for a movement input), communicate with external devices (e.g. a computer host through a cable 24) and so on. Furthermore, in practice, the circuit board and the lower casing part 124 can be regarded as a whole for supporting the wheel supporting structure 14. For example, the wheel supporting structure 14 can be disposed on one or both of the circuit board and the lower casing part 124.

The wheel supporting structure 14 includes a wheel bracket 142, a bracket support 144, and a bracket guiding slot 146. The bracket support 144 and the bracket guiding slot 146 are disposed oppositely on the lower casing part 124. An end portion of the wheel bracket 142 is rotatably connected to the bracket support 144, so that the wheel bracket 142 can swing left and right around an X axis Ax (indicated by a chain line in FIG. 2 and FIG. 3) and also can swing up and down around a Y axis Ay (indicated by a chain line in FIG. 2 and FIG. 3). Therein, the X axis Ax and the Y axis Ay are perpendicular to each other. Another end portion of the wheel bracket 142 is slidably disposed in the bracket guiding slot 146, so that the wheel bracket 142 can swing up and down around a Y axis Ay stably. The scroll wheel 16 is rotatably supported on the rotary shaft 164 by the wheel bracket 142 and can rotate around the rotation axis 16a (parallel to the Y axis Ay) relative to the wheel bracket 142. The hook part 18 and the linking part 20 are pivotally connected to the wheel bracket 142. The hook part 18, the linking part 20, and the scroll wheel 16 will swing relative to the device casing 12 together with the wheel bracket 142. Furthermore, the wheel bracket 142 has a left arm 142a and a right arm 142b which extend substantially along two opposite directions parallel to the Y axis Ay respectively. The input device 1 includes a left switch 25a and a right switch 25b (e.g. fixed on the circuit board of the control module 126) which are located under ends of the left arm 142a and the right arm 142b respectively. When the wheel bracket 142 swings right around the X axis Ax, the right arm 142b triggers the right switch 25b; when the wheel bracket 142 swings left around the X axis Ax, the left arm 142a triggers the left switch 25a. Furthermore, the wheel supporting structure 14 further includes a restoration spring 148 compressed by and disposed between the wheel bracket 142 and the lower casing part 124, for driving the wheel bracket 142 to rotate upward around the Y axis Ay back to its original position. The original position can be determined by a design of an end 146a of the bracket guiding slot 146 blocking the wheel bracket 142.

Figure 5:
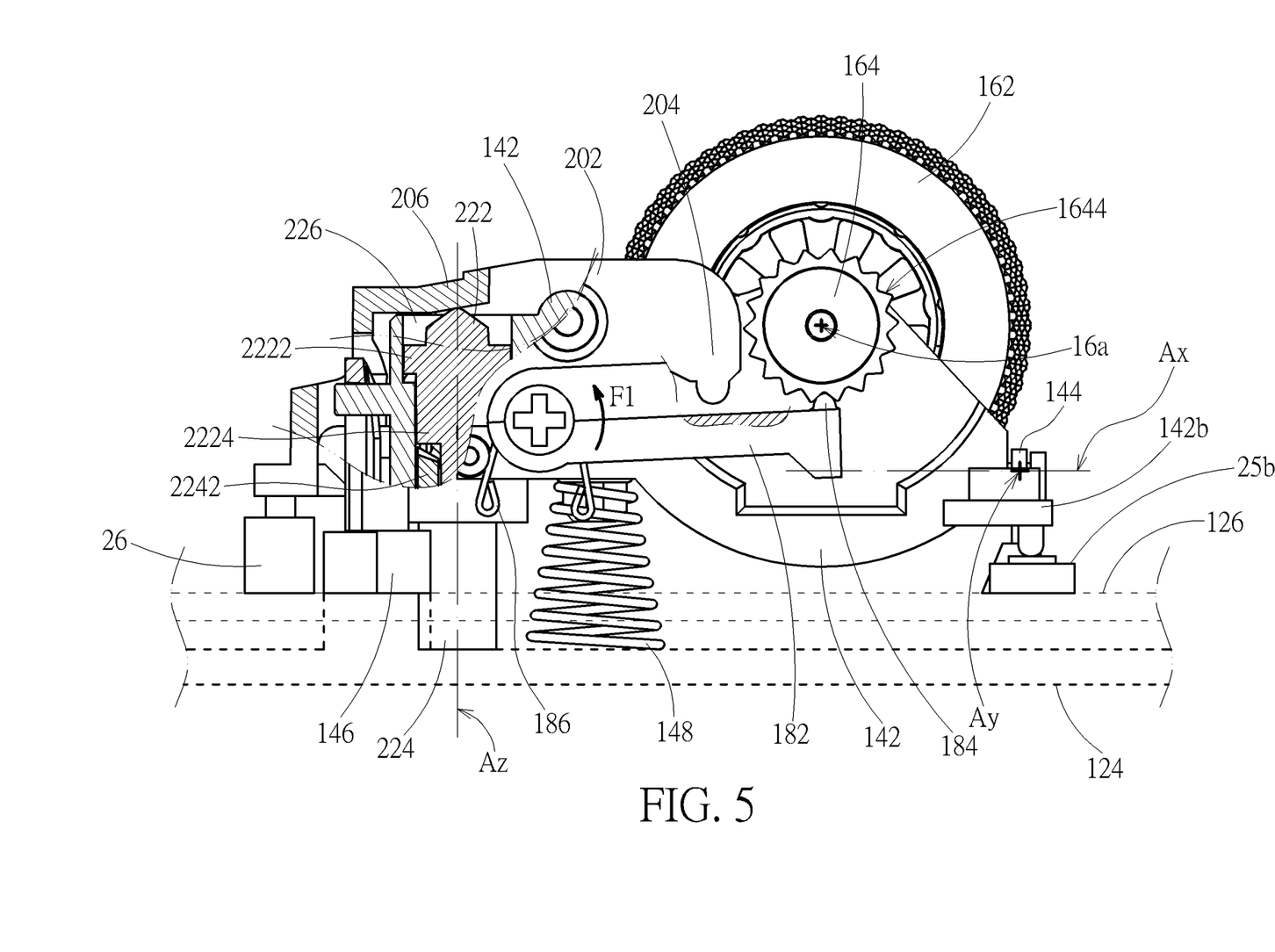
FIG. 5 is a side view of the interior of the input device in FIG. 2 with a hook part of the input device engaging with toothed slots of a scroll wheel of the input device.
Figure 6:
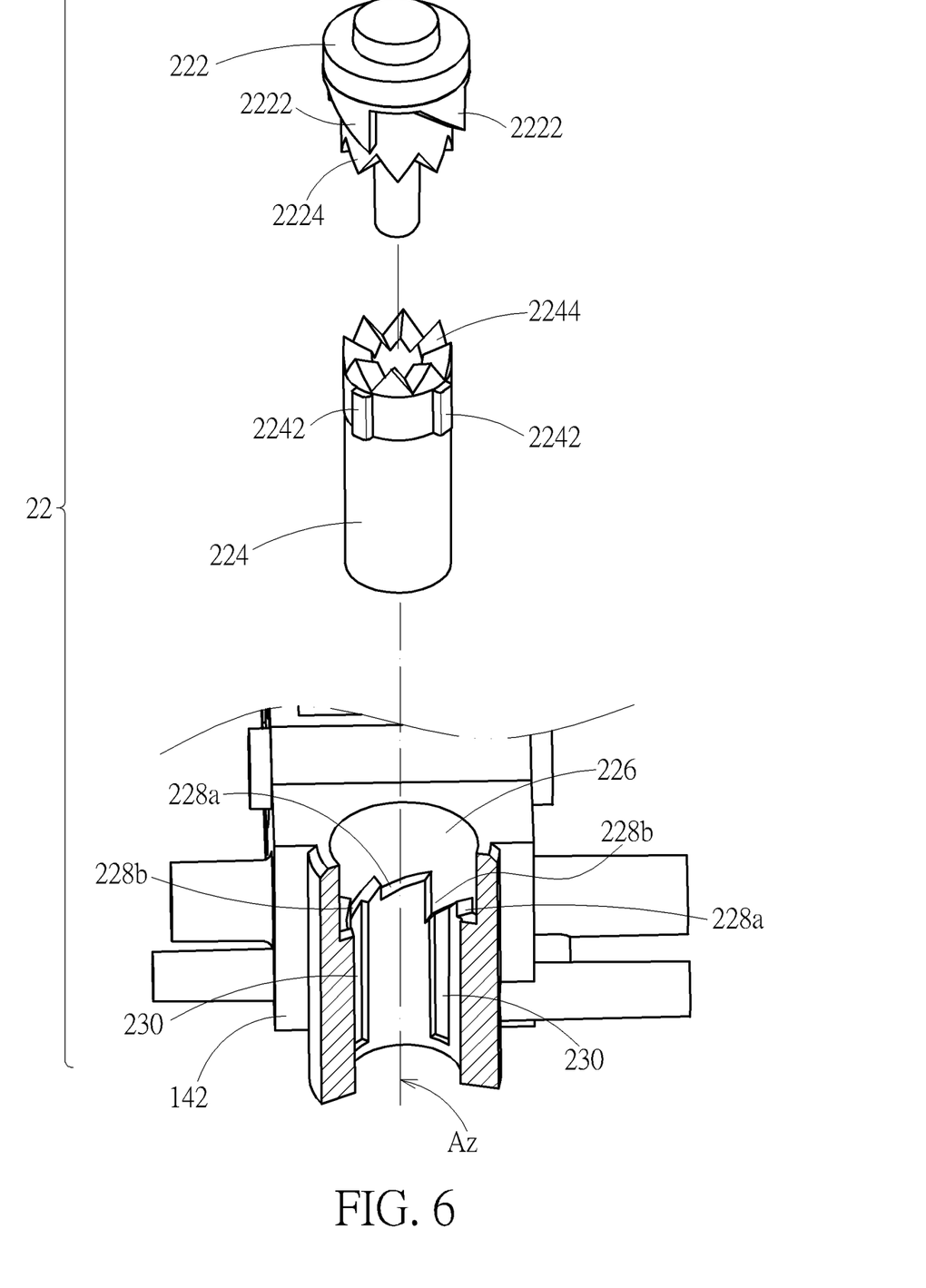
FIG. 6 is a schematic diagram illustrating a switching mechanism of the input device in FIG. 4.

Please also refer to FIG. 5 and FIG. 6. In FIG. 5, the wheel supporting structure 14 and the linking part 20 are partially cut off for clearly showing that the abutting part 222 abuts against the linking part 20; the hook part 18 is also partially cut off for clearly showing the connection status of the linking part 20 to the hook part 18. In the embodiment, the hook part 18 includes a hook body 182, a hooking portion 184, and a hook biasing spring 186. The hook body 182 is pivotally connected to the wheel bracket 142 of the wheel supporting structure 14. The hooking portion 184 is disposed on the hook body 182. The hooking portion 184 and the toothed slot 1644 match with each other in profile. The hook biasing spring 186 is disposed to apply a rotation force F1 (indicated by an arrow in FIG. 5) to the hook body 182 to rotate toward the rotary shaft 164; thereby, the hooking portion 184 is biased to fit in one of the toothed slots 1644. In the embodiment, the biasing spring 186 is but not limited to a torsion spring that is pre-twisted and connected to the wheel bracket 142 and the hook body 182 by its two ends respectively. In practice, it is also practicable to use a bent spring piece as the biasing spring 186. Two ends of the bent spring piece abut against the wheel bracket 142 and the hook body 182 respectively. For another instance, it is also practicable to use a spring cantilever as the hook part 18, of which one end is fixed on the wheel bracket 142, and of which the other end (i.e. a free end of the spring cantilever, e.g. forming a hook-shaped structure) engages with the toothed slots 1644. The spring cantilever is biased to engage with the toothed slots 1644 through its elasticity.

The linking part 20 has a pivotal portion 202, a first side portion 204, and a second side portion 206. The pivotal portion 202 is pivotally connected to the wheel bracket 142 and connects the first side portion 204 and the second side portion 206. The first side portion 204 abuts against the hook body 182. The abutting part 222 abuts against the second side portion 206. The input device 1 further includes a link biasing spring 21, of which two ends are connected to the linking part 20 and the wheel bracket 142, so that the linking part 20 has a tendency to depart from the hook part 18 (i.e. moving in the direction away from the hook part 18), which is conducive to the engagement stability of the hooking portion 184 with the toothed slots 1644. In the embodiment, the switching mechanism 22 also includes a sliding channel 226 formed on the wheel bracket 142, a plurality of high and low positioning slots 228a and 228b formed in the sliding channel 226, and a plurality of guiding slots 230 formed in the sliding channel 226. The sliding channel 226 extends along a Z axis Az (indicated by a chain line in FIG. 5 and FIG. 6). The high positioning slots 228a and the low positioning slots 228b are staggered around the Z axis Az. Therein, the X axis Ax, the Y axis Ay (indicated by a cross mark in FIG. 5), and the Z axis Az are perpendicular to each other. The abutting part 222 and the switching part 224 are slidably disposed in the sliding channel 226. The switching part 224 has a plurality of guided ribs 2242 slidably disposed in the guiding slots 230 correspondingly, and a driving structure 2244. The abutting part 222 has a plurality of positioned blocks 2222 and a driven structure 2224. The driving structure 2244 and the driven structure 2224 are formed in a form of sharp teeth. The positioned blocks 2222 can be located in the high positioning slots 228a or the low positioning slots 228b by the interaction between the switching part 224 and the abutting part 222, so as to change the position (or the height) of the abutting part 222 relative to the wheel bracket 142 along the Z axis Az to make the abutting part 222 selectively abut against the second side portion 206, so that the rotation angle of the linking part 20 relative to the wheel bracket 142. Thereby, the linking part 20 through the first side portion 204 controls the hooking portion 184 of the hook part 18 to engage with the toothed slots 1644 or not.

In the status shown by FIG. 5, the positioned blocks 2222 of the abutting portion 222 are located in the low positioning slots 228b. The first side portion 204 of the linking part 20 does not touch the hook body 182 of the hook part 18. The hook body 182 receives the rotation force F1 to have a tendency to rotate counterclockwise, so that the hook part 18 can engage with the toothed slots 1644 stably. At the moment, the hook part 18 and the toothed slots 1644 are at an engaging state. When the hook part 18 is required to be departed from the toothed slots 1644, the user can press the scroll wheel 16 (i.e. the wheel portion 162) to make the wheel bracket 142 swing downward around the Y axis Ay (indicated by a cross mark in FIG. 5). Under the constraint by the lower casing part 124, the switching part 224 will not rotate together with the wheel bracket 142 but will relatively slide in the sliding channel 226. Therein, because the guiding slots 230 are parallel to the Z axis Az and structurally constrain the guided ribs 2242, the switching part 224 will not rotate relative to the sliding channel 226. The abutting part 222 rotates together with the wheel bracket 142 until the abutting part 222 is blocked by the switching part 224 (i.e. when the driven structure 2224 of the abutting part 222 touches the driving structure 2244 of the switching part 224); then, the abutting part 222 relatively slides in the sliding channel 226, so that the positioned blocks 2222 depart from the low positioning slots 228b. Besides, the engaging surfaces between the driving structure 2244 and the driven structure 2224 are slanted slightly, so after the positioned blocks 2222 depart from the low positioning slots 228b, the driving structure 2244 will rotate the abutting part 222 around the Z axis Az by an angle.

Figure 7:
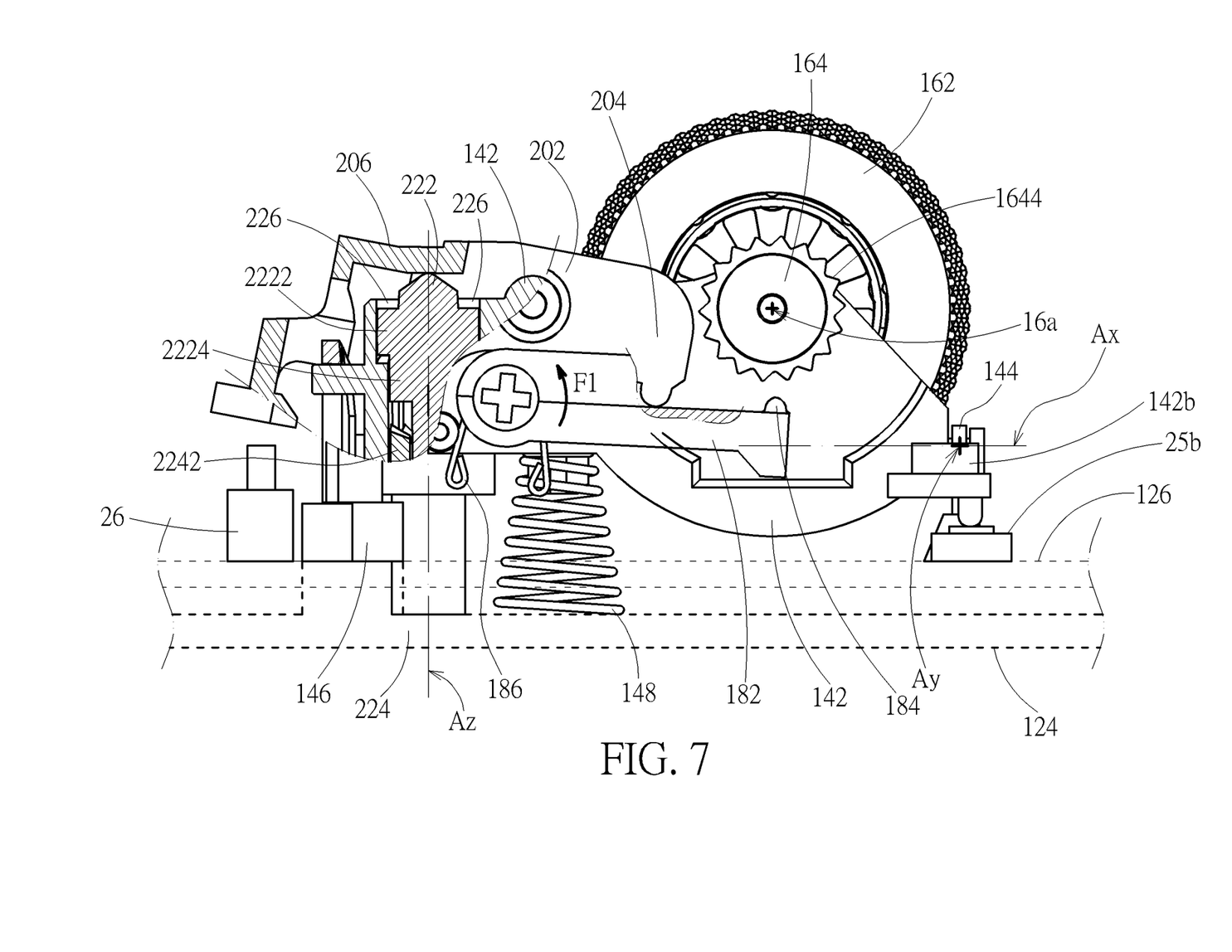
FIG. 7 is a side view of the interior of the input device in FIG. 2 with the hook part disengaging from the toothed slots.

Afterward, when the user stops pressing the scroll wheel 16, the restoration spring 148 drives the wheel bracket 142 to swing upward around the Y axis Ay (i.e. rotating back), as shown by FIG. 7. In the movement of the wheel bracket 142 swinging upward, the switching part 224 will not rotate together with the wheel bracket 142. When the high positioning slots 228a or the low positioning slots 228b touch the positioned blocks 2222, the abutting part 222 will rotate together with the wheel bracket 142 so that the driven structure 2224 of the abutting part 222 is disengaged from the driving structure 2244 of the switching part 224. Then, the positioned blocks 2222 are structurally constrained by the high positioning slots 228a to make the abutting part 222 rotate around the Z axis Az by another angle until the positioned blocks 2222 are engaged with the high positioning slots 228a. Thereby, one switching operation is performed. At the moment, the positioned blocks 2222 are located in the high positioning slots 228a. In other words, by this switching operation, the switching part 224 switches the abutting part 222 to a higher position (as shown by FIG. 7). The abutting part 222 pushes the linking part 20 to rotate clockwise so as to rotate the hook part 18, so that the hook part 18 rotates away relative to the rotary shaft 164 (i.e. the hook part 18 disengages from the toothed slots 1644). At the moment, the hook part 18 and the toothed slots 1644 are at a disengaging state. The drag force on the rotation of the scroll wheel 16 (for retarding the rotating of the scroll wheel 16) reaches a minimum in principle; that is, the input device 1 provides the user a less tactile feedback. It is suitable for rotating the scroll wheel 16 fast, e.g. applied to a case of rapidly scrolling a web page. In practice, at the moment, the user senses almost no drag force on the rotation of the scroll wheel 16, so the tactile feedback provided by the input device 1 can be regarded as zero logically.

When the engagement status of the hook part 18 with the scroll wheel 16 (i.e. the toothed slots 1644) is required to be switched again (e.g. switching the positioned blocks 2222 from the high positioning slots 228a to the low positioning slots 228b), the user can perform this by pressing the scroll wheel 16 again. The operation detail therefor is similar to the above-mentioned description of switching the positioned blocks 2222 from the low positioning slots 228b to the high positioning slots 228a, which will not be described in addition. Therefore, the user can change the engagement status of the hook part 18 with the toothed slots 1644 through the switching mechanism 22 (e.g. by pressing the scroll wheel 16). Furthermore, when the hook part 18 and the toothed slots 1644 are at the engaging state (as shown by FIG. 5), the drag force on the scroll wheel 16 is contributed mainly by the structural interference of the hooking portion 184 with the toothed slots 1644 and reaches a maximum relatively. The user can sense a distinct tactile feedback. It is suitable for common input applications.

Figure 8:
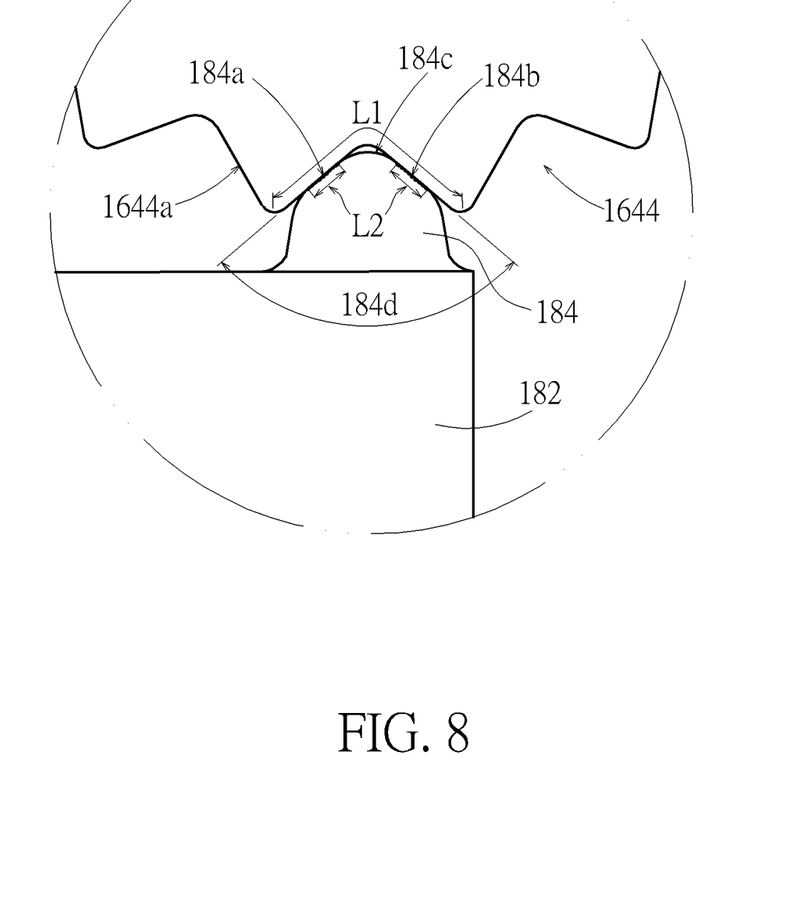
FIG. 8 is an enlarge side view of the hook part engaged with one of the toothed slots.

Please also refer to FIG. 8. The structural interference of the hooking portion 184 with the toothed slots 1644 is based on the engagement of the hooking portion 184 with the toothed slots 1644. In the embodiment, the scroll wheel 16 rotates relative to the rotation axis 16a (indicated by a cross mark in FIG. 5 and FIG. 7). The toothed slot 1644 has a slot surface 1644a, on which the hooking portion 184 relatively slides when the scroll wheel 16 rotates. A projection of the slot surface 1644a on a reference plane (i.e. the drawing plane of FIG. 8) perpendicular to the rotation axis 16a (or the rotary shaft 164) has a first profile length L1. When the hooking portion 184 is completely engaged with the toothed slot 1644 (as shown by FIG. 8), a projection of at least one contact area of the hooking portion 184 contacting the slot surface 1644a on the reference plane has a second profile length L2 (i.e. a sum of two contact areas at left and right sides, indicated by two dashed lines respectively). In practice, a ratio of the second profile length L2 to the first profile length L1 is within a range from 25% to 80%. Furthermore, in the embodiment, the hooking portion 184 has a first flat surface 184a, a second flat surface 184b, and a connecting surface 184c connecting the first flat surface 184a and the second flat surface 184b. In practice, an included angle 184d between the first flat surface 184a and the second flat surface 184b is within a range from 45 degrees to 135 degrees. In addition, in practice, the hooking portion 184 and the toothed slot 1644 can be provided with matching arc profiles. For example, the hooking portion 184 has a convex semicircular profile, and the toothed slot 1644 has a matching concave semicircular profile. For this structure configuration, it is also practicable for the hooking portion 184 to retard the rotating of the scroll wheel 16.

Furthermore, in the embodiment, the input device 1 includes a switch 26 disposed in the device casing 12 close to the linking part 20 (e.g. mounted on the circuit board of the control module 12). The linking part 20 can be rotated to trigger the switch 26. Thereby, the control module 12 can sense the engagement status of the hooking portion 184 with the toothed slots 1644 through the status of the switch 26. In the embodiment, when the abutting part 222 is located at the lower position (i.e. the positioned blocks 2222 are located in the lower positioning slots 228b, by which the hooking portion 184 is engaged with the toothed slots 1644), the linking part 20 is rotated by hook part 18 to press the switch 26, as shown by FIG. 5. In practice, the control module 12 can be designed to operate in different mode according to the status of the switch 26, which can be realized by firmware. For example, the control module 12 can determine whether the input device 1 is at a hyper scroll mode by sensing the status of the switch 26. If YES (i.e. the hooking portion 184 is not engaged with the toothed slots 1644), the control module 12 switches to a high sampling rate to prevent loss high scrolling data. If NO (i.e. the hooking portion 184 is engaged with the toothed slots 1644), the control module 12 switches to a low sampling rate to save power.

For another example, the control module 12 is also designed to determine whether the input device 1 is at a hyper scroll mode by sensing the status of the switch 26. If YES (i.e. the hooking portion 184 is not engaged with the toothed slots 1644, as shown by FIG. 7; therein, the switch 26 is not pressed by the linking part 20), the control module 12 sets various sampling rates for different scrolling input (i.e. the scrolling of the scroll wheel 16 by the user), so as to meet user experience. For example, if the scroll wheel 16 actually rotates for 13 seconds, the control module 12 judges it is too long and then reduces to 8 seconds (i.e. output an 8-second scrolling output to the external device, e.g. a computer host). If the scroll wheel 16 actually rotates for 3 seconds, the control module 12 judges it is too short and then increases to 8 seconds (i.e. output an 8-second scrolling output to the external device). If the scroll wheel 16 actually rotates at 3 circles per second, the control module 12 judges it is too fast and then reduce to 2 circles per second (i.e. output a scrolling output of 2 circles per second to the external device). If the scroll wheel 16 actually rotates at 1.5 circles per second, the control module 12 judges it is too slow and then increase to 2 circles per second (i.e. output a scrolling output of 2 circles per second to the external device). If NO (i.e. the hooking portion 184 is engaged with the toothed slots 1644), the control module 12 counts the number of scrolling according to the mechanical/hardware structure of the scroll wheel 16.

Figure 9:
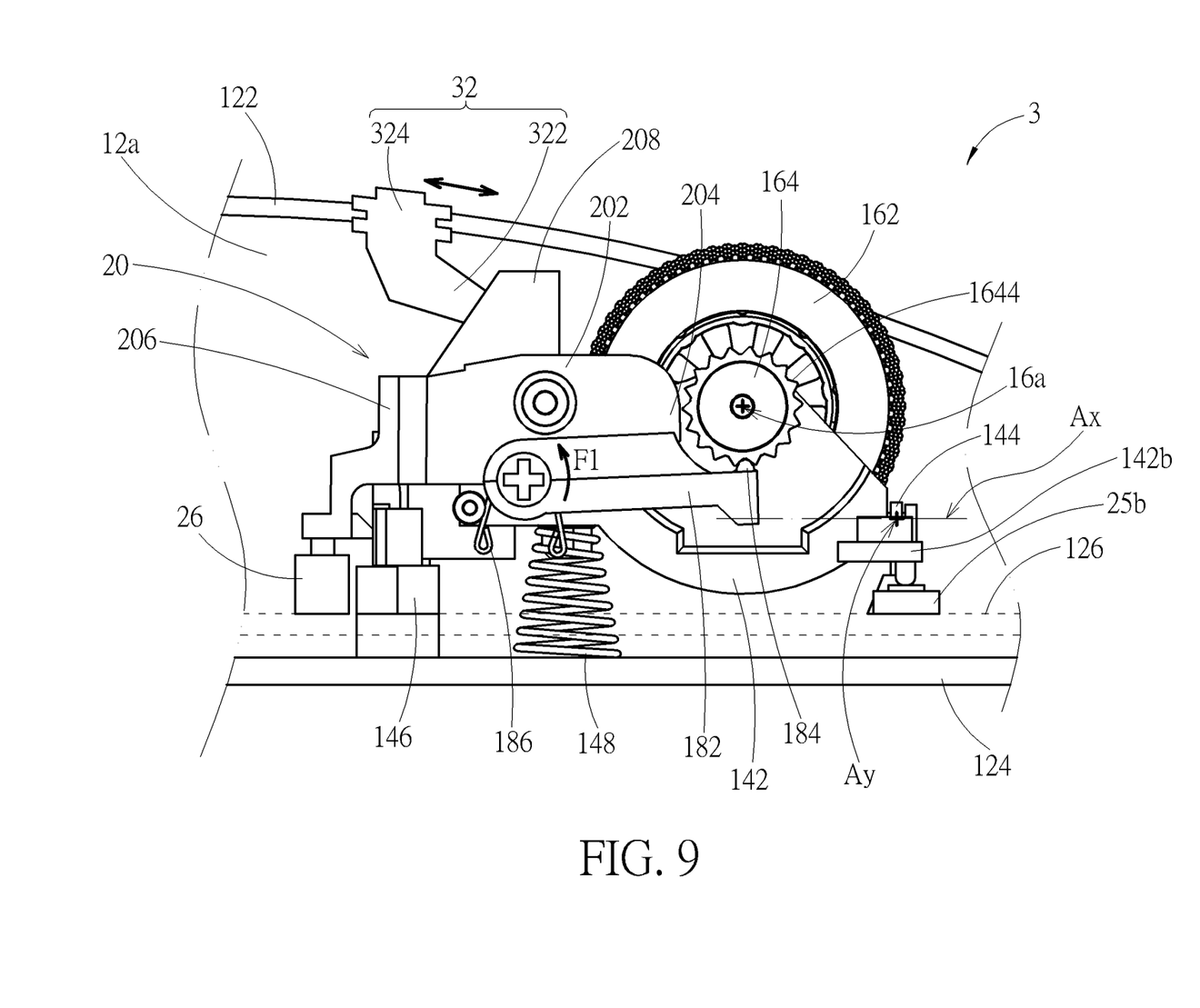
FIG. 9 is a side view of the interior of an input device according to another embodiment.

In the embodiment, the switching mechanism 22 is a push-push mechanism in logic. In practice, the switching mechanism 22 also can be realized by another kind of push-push mechanism, for example, by using a one-way circular slot with a post that is allowed to slide in the one-way circular slot in only one direction. Furthermore, in practice, the switching mechanism 22 can use different structure to change the angular position of the linking part 20 relative to the wheel bracket 142. For example, as shown by FIG. 9, an input device 3 is substantially similar to the input device 1 in structure. For simplification of description, the input device 3 uses the reference numbers of the input device 1. For other descriptions about the input device 3, please refer to the relevant descriptions of the input device 1 and the variation thereof, which will not be described in addition. In the input device 3, a switching mechanism 32 thereof is disposed in the device casing 12 and includes an abutting part 322 and a switching part 324 fixedly connected to the abutting part 322. The switching part 324 is slidably disposed on and exposed from the upper casing part 122 of the device casing 12; that is, the switching part 324 is exposed from the top of the device casing 12. The linking part 20 of the input device 3 has a protruding portion 208 that contacts the abutting part 322. Thereby, the switching part 324 can be slid by the user along the upper casing part 122 (i.e. along the direction indicated by a bidirectional arrow in FIG. 9) to rotate the linking part 20 so as to make the hook part 18 engage with or disengage from the toothed slots 1644.

Figure 10:
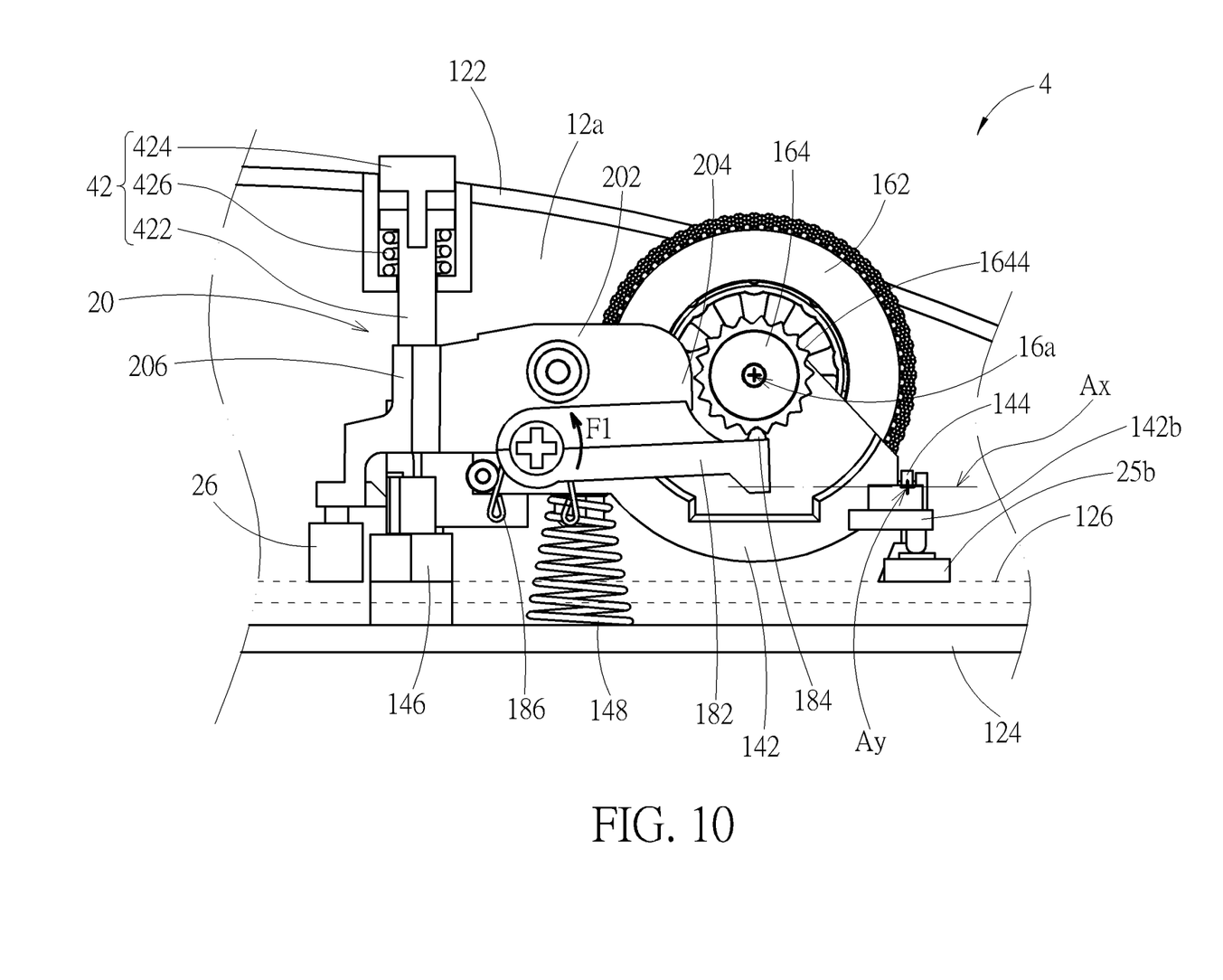
FIG. 10 is a side view of the interior of an input device according to another embodiment.

For another example, as shown by FIG. 9 and FIG. 10, an input device 4 is substantially similar to the input device 1 in structure. For simplification of description, the input device 4 uses the reference numbers of the input device 1. For other descriptions about the input device 4, please refer to the relevant descriptions of the input device 1 and the variation thereof, which will not be described in addition. In the input device 4, a switching mechanism 42 thereof is disposed in the device casing 12 and includes an abutting part 422, a switching part 424, a restoration spring 426, and a positioning structure (not shown in the figures). The abutting part 422 abuts against the second side portion 206. The switching part 424 is exposed from the upper casing part 122. The restoration spring 426 abuts against the switching part 424. The user can press the switching part 424 to push against the abutting part 422 so as to change the position of the abutting part 422 relative to the second side portion 206 under the structural constraint of the positioning structure, so that the rotation angle of the linking part 20 relative to the wheel bracket 142 is changed to control the hooking portion of the hook part 18 to engage with or disengage from the toothed slots 1644. Therein, when the user does not press the switching part 424 any longer, the restoration spring 426 pushes against the switching part 424 back to its original position. Furthermore, for descriptions about the structural interaction between the abutting part 422, the switching part 424, and the positioning structure, please refer to the relevant descriptions of the switching mechanism 22, which will not be described in addition. Furthermore, in practice, the switching mechanism 42 can be realized by a common push-push mechanism (e.g. a mechanism for the tip of a ballpoint pen).

Figure 11:
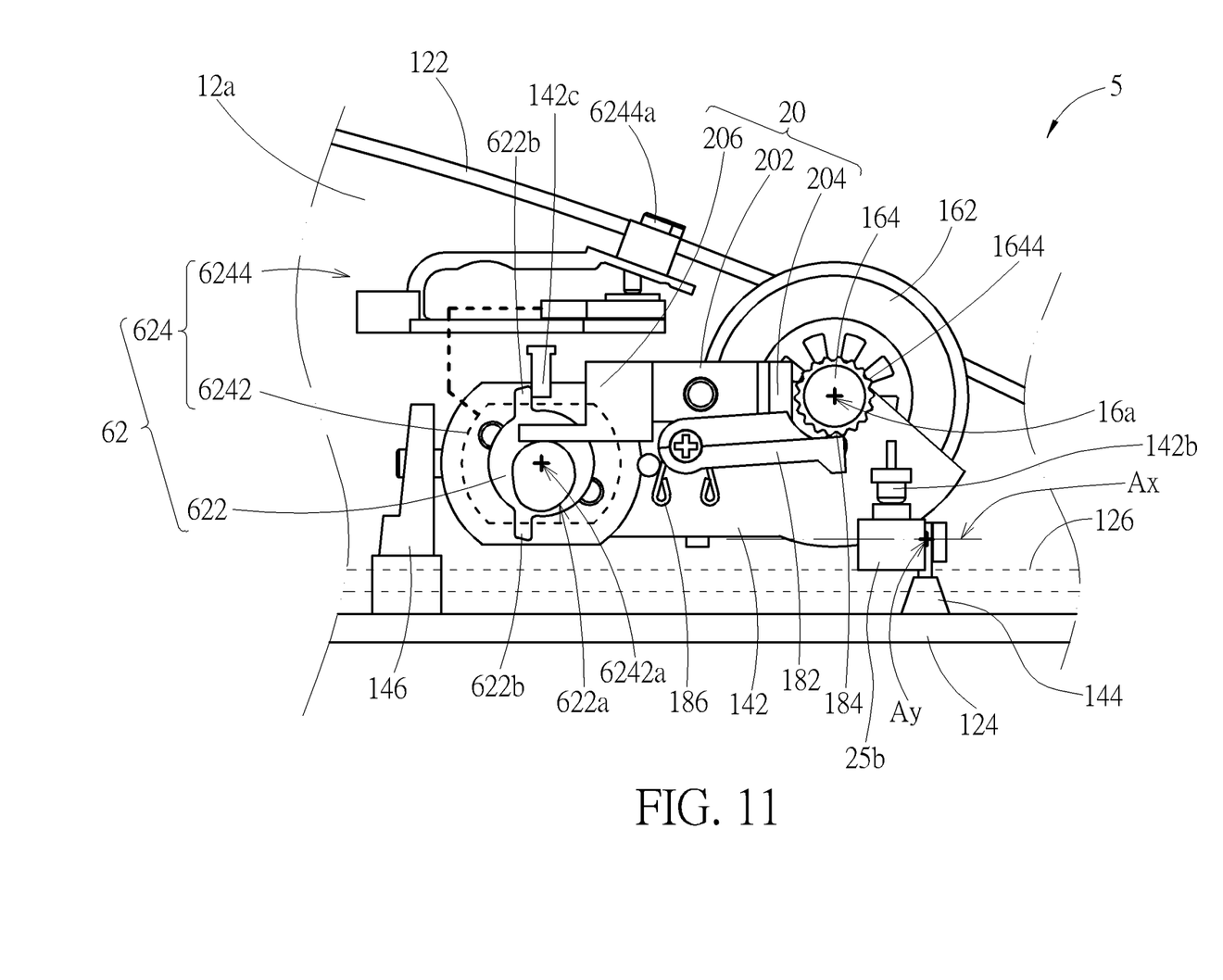
FIG. 11 is a side view of the interior of an input device according to another embodiment.
Figure 12:
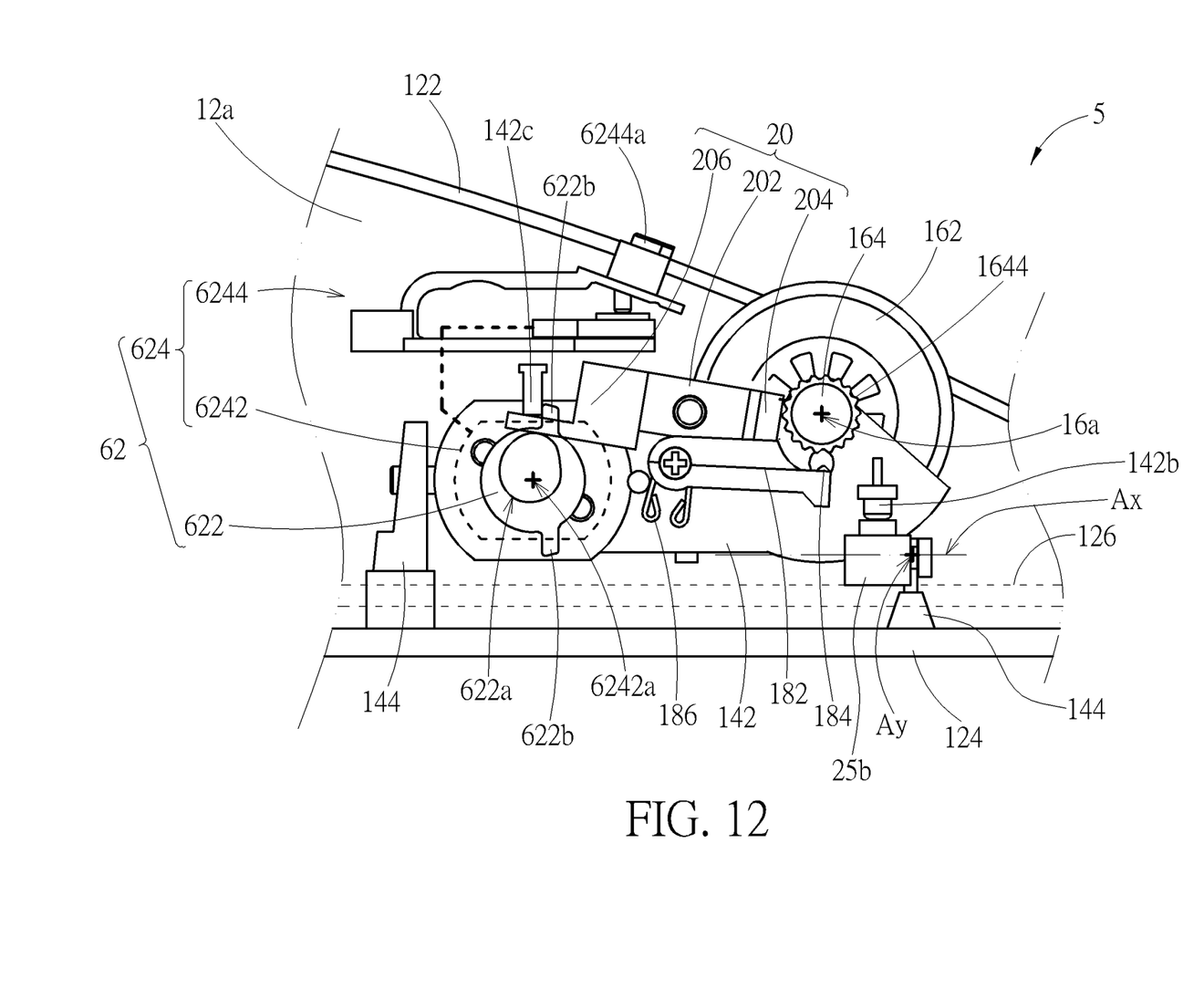
FIG. 12 is a side view of the interior of the input device in FIG. 11 with the hook part disengaging from the toothed slots.

In the above embodiments, the switching mechanism 22, 32 and 42 involve only mechanical parts for disengage the hook part 18 from the scroll wheel 16; however, it is not limited thereto in practice. For example, as shown by FIG. 11 and FIG. 12, an input device 5 is substantially similar to the input device 1 in structure. For simplification of description, the input device 5 uses the reference numbers of the input device 1. For other descriptions about the input device 5, please refer to the relevant descriptions of the input device 1 and the variation thereof, which will not be described in addition. In the input device 5, a switching mechanism 62 thereof is disposed in the device casing 12 and includes an abutting part 622 and a switching part 624 connected to the abutting part 622. The switching part 624 includes a motor 6242 (of which the profile is indicated in dashed lines in FIG. 11 and FIG. 12) fixed in the wheel bracket 142, and a switch 6244 (having a button 6244a exposed from the upper casing part 122 of the device casing 12 for a user to press for triggering the switch 6244) disposed in the device casing 12 and electrically connected to the motor 6242 (indicated by bold dashed lines in FIG. 11 and FIG. 12). The shaft of the motor 6242 has a rotation axis 6242a (indicated by a cross mark in FIG. 11 and FIG. 12). The abutting part 622 is a cam part fixed to the shaft of the motor 6242. The abutting part 622 has a cam surface 622a abutting against the linking part 20. Thereby, a user can trigger the switch 6244 for driving the motor 6242 to rotate the abutting part 622. The abutting part 622 can be rotated by the motor 6242 to be at different angular positions selectively. When the abutting part 622 is at a first angular position (as shown by FIG. 11), the hooking portion 184 is still hooking one of the toothed slots 1644. When the abutting part 622 is at a second angular position (as shown by FIG. 12), the linking part 20 is rotated by the cam surface 622a of the abutting part 622 to rotate hook part 18 to disengage from the scroll wheel 16.

Furthermore, in the embodiment, the abutting part 622 has two protrusions 622b. A block 142c is disposed on the wheel bracket 142 for blocking the protrusions 622b. The block 142c can stop the rotation of the abutting part 622 to orientate the abutting part 622 to be at the first angular position (as shown by FIG. 11) and the second angular position (as shown by FIG. 12). Thereby, the motor 6242 can be achieved by a common electric motor, but not limited to servomotors.

In addition, in the above embodiments, the input devices 1, 3, 4 and 5 are illustrated in form of a mouse; however, it is not limited thereto in practice. In principle, the above structural features relating to the scroll wheel 16 are also practicable to any input device provided with a scroll wheel, e.g. a keyboard with a scroll wheel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An input device, comprising:
a device casing;
a wheel supporting structure, disposed in the device casing;
a scroll wheel, rotatably supported by the wheel supporting structure and protruding out of the device casing, the scroll wheel having a rotary shaft, the rotary shaft having a peripheral surface and a plurality of toothed slots on the peripheral surface;
a hook part, disposed biased on the wheel supporting structure to engage with one of the toothed slots;
a linking part, pivotally connected to the wheel supporting structure, the linking part having a pivotal portion, a first side portion, and a second side portion, the pivotal portion being pivotally connected to the wheel supporting structure and connecting the first side portion and the second side portion, the first side portion abutting against the hook part; and
a switching mechanism, disposed in the device casing, the switching mechanism comprising an abutting part and a switching part, the abutting part abutting against the second side portion of the linking part, the switching part being coupled to the abutting part and the device casing respectively;
wherein the switching mechanism is operable to move the abutting part through the switching part to rotate the linking part to abut against and move the hook part to disengage from the toothed slots.

2. The input device according to claim 1, wherein the switching mechanism is a push-push mechanism, the switching part is exposed from the device casing, and the switching part is operable to switching a position of the abutting part.

3. The input device according to claim 1, wherein the switching part is slidably disposed on the device casing and is exposed out of the device casing, and the abutting part and the switching part are fixedly connected.

4. The input device according to claim 1, wherein the switching part includes a motor and a switch electrically connected to the motor, the abutting part is a cam part fixed to a shaft of the motor, the cam part has a cam surface abutting against the linking part, and the switch is able to be triggered to drive the shaft to rotate.

5. The input device according to claim 4, wherein the switch is exposed from the device casing.

6. The input device according to claim 1, wherein the hook part comprises a hook body and a hook biasing spring, the hook body is pivotally connected to the wheel supporting structure, the hook biasing spring is disposed to apply a rotation force to the hook body to rotate toward the rotary shaft, and the switching mechanism is operable to move the abutting part through the switching part to rotate the linking part to rotate the hook body to rotate away from the rotary shaft.

7. The input device according to claim 1, wherein the hook part comprises a hooking portion, and the hooking portion and the toothed slot match with each other in profile.

8. The input device according to claim 7, wherein the scroll wheel has a rotation axis and rotates relative to the rotation axis, the toothed slot has a slot surface, on which the hooking portion relatively slides when the scroll wheel rotates, a projection of the slot surface on a reference plane perpendicular to the rotation axis has a first profile length, and when the hooking portion is completely engaged with the toothed slot, a projection of at least one contact area of the hooking portion contacting the slot surface on the reference plane has a second profile length, and a ratio of the second profile length to the first profile length is within a range from 25% to 80%.

9. The input device according to claim 7, wherein the hooking portion has a first flat surface, a second flat surface, and a connecting surface connecting the first flat surface and the second flat surface, and an included angle between the first flat surface and the second flat surface is within a range from 45 degrees to 135 degrees.

10. The input device according to claim 1, wherein the wheel supporting structure comprises a wheel bracket and a bracket support, the wheel bracket is rotatably connected to the bracket support, the bracket support is fixed on the device casing, the scroll wheel is rotatably supported by the wheel bracket, the hook part is disposed on the wheel bracket, and the linking part is pivotally connected to the wheel bracket.

11. The input device according to claim 10, wherein the switching mechanism comprises a sliding channel formed on the wheel bracket, and a high positioning slot and a low positioning slot which are formed in the sliding channel, the abutting part and the switching part are slidably disposed in the sliding channel, the abutting part is selectively engaged with one of the high positioning slot and the low positioning slot, the switching part abuts against a bottom of the device casing, the scroll wheel is able to be pressed to rotate the wheel bracket toward the bottom, so that the switching part pushes against the abutting part to make the abutting part depart from one of the high positioning slot and the low positioning slot, and when the wheel bracket rotates backward, the abutting part is engaged with the other one of the high positioning slot and the low positioning slot.

12. The input device according to claim 11, wherein the wheel bracket is operable to swing up and down around a Y axis and left and around an X axis relative to the device casing through the bracket support, the sliding channel extends along a Z axis, and the X axis, the Y axis, and the Z axis are perpendicular to each other.

13. The input device according to claim 1, further comprising a switch disposed in the device casing close to the linking part, wherein the linking part is able to be rotated to trigger the switch.

14. An input device, comprising:
a device casing, having an accommodating space inside;
a bracket support, fixed on the device casing;
a wheel bracket, rotatably connected to the bracket support, so that the wheel bracket is operable to swing around an X axis;
a scroll wheel, rotatably supported by the wheel bracket and protruding out of the device casing, the scroll wheel having a rotary shaft, the rotary shaft extending along a rotation axis, so that the scroll wheel is operable to rotate around the rotation axis, the rotary shaft having a gear, the gear having a plurality of toothed slots on a peripheral surface of the gear, the rotation axis being perpendicular to the X axis;
a hook part, disposed biased on the wheel bracket to selectively engage with one of the toothed slots;
a linking part, pivotally connected to the wheel bracket; and
a switching mechanism, disposed on the wheel bracket and comprising an abutting part and a switching part, the abutting part selectively abutting against the linking part, the switching part being coupled to the abutting part and the device casing respectively;
wherein the switching mechanism is operable to move the abutting part through the switching part to rotate the linking part to abut against and move the hook part to disengage from the toothed slots;
wherein when the wheel bracket swings around the X axis, the switching mechanism, the linking part and the hook part together with the wheel bracket swing around the X axis in the accommodating space.

15. The input device according to claim 14, further comprising a left switch and a right switch, wherein the wheel bracket has a left arm and a right arm, the left arm and the right arm extend substantially along two opposite directions parallel to the rotation axis respectively, the left switch and the right switch are located under ends of the left arm and the right arm respectively, when the wheel bracket swings right around the X axis, the right arm triggers the right switch, and when the wheel bracket swings left around the X axis, the left arm triggers the left switch.

16. The input device according to claim 14, further comprising a link biasing spring, wherein the hook part comprises a hook biasing spring, the link biasing spring and the hook biasing spring are disposed on the wheel bracket, the link biasing spring applies a force to the linking part to move in a direction away from the hook part, and the hook biasing spring applies a force to the hook part to engage with one of the toothed slots.

17. The input device according to claim 14, wherein the linking part has a pivotal portion, a first side portion, and a second side portion, the pivotal portion is pivotally connected to the wheel bracket and connects the first side portion and the second side portion, the first side portion selectively abuts against the hook part, the abutting part is operable to change a height position of the abutting part along a Z axis to selectively abut against the second side portion, and the X axis, the rotation axis, and the Z axis are perpendicular to each other.

18. An input device, comprising:
a device casing, having an accommodating space inside;
a bracket support, fixed on the device casing;
a wheel bracket, rotatably connected to the bracket support, so that the wheel bracket is operable to swing around an X axis;
a scroll wheel, rotatably supported by the wheel bracket and protruding out of the device casing, the scroll wheel having a rotary shaft, the rotary shaft extending along a rotation axis, so that the scroll wheel is operable to rotate around the rotation axis, the rotary shaft having a gear, the gear having a plurality of toothed slots on a peripheral surface of the gear, the rotation axis being perpendicular to the X axis;
a hook part, disposed biased on the wheel bracket to selectively engage with one of the toothed slots;
a linking part, pivotally connected to the wheel bracket, the linking part having a pivotal portion, a first side portion, and a second side portion, the pivotal portion being pivotally connected to the wheel bracket and connecting the first side portion and the second side portion, the first side portion selectively abutting against the hook part; and
a switching mechanism, disposed on the wheel bracket and comprising an abutting part and a switching part, the abutting part selectively abutting against the linking part, the switching part being coupled to the abutting part and the device casing respectively, the abutting part being operable to change a height position of the abutting part along a Z axis to selectively abut against the second side portion, the X axis, the rotation axis, and the Z axis being perpendicular to each other;
wherein the switching mechanism is operable to move the abutting part through the switching part to rotate the linking part to abut against and move the hook part to disengage from the toothed slots;
wherein when the wheel bracket swings around the X axis, the linking part and the hook part together with the wheel bracket swing around the X axis in the accommodating space.

* * * * *